United States Patent
Cao et al.

(10) Patent No.: US 12,443,927 B2
(45) Date of Patent: Oct. 14, 2025

(54) PRIVACY-PRESERVING GRIDLOCK RESOLUTION

(71) Applicant: International Business Machines Corporation, Armonk, NY (US)

(72) Inventors: Shengjiao Cao, Singapore (SG); Yuan Yuan, Singapore (SG); Yanyan Hu, Singapore (SG); Karthik Nandakumar, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 16/365,778

(22) Filed: Mar. 27, 2019

(65) Prior Publication Data

US 2020/0311695 A1   Oct. 1, 2020

(51) Int. Cl.
*G06Q 20/40* (2012.01)
*G06Q 20/02* (2012.01)
*G06Q 20/38* (2012.01)
*H04L 9/40* (2022.01)

(52) U.S. Cl.
CPC ......... *G06Q 20/027* (2013.01); *G06Q 20/389* (2013.01)

(58) Field of Classification Search
USPC .......................................................... 705/39
See application file for complete search history.

(56) References Cited

U.S. PATENT DOCUMENTS

| 9,870,508 B1 * | 1/2018 | Hodgson ................ G11B 27/10 |
| 9,875,510 B1 * | 1/2018 | Kasper .................. G06Q 40/12 |
| 2002/0198827 A1 | 12/2002 | van Leeuwen |
| 2012/0089494 A1 | 4/2012 | Danezis et al. |
| 2017/0005804 A1 | 1/2017 | Zinder |
| 2017/0337534 A1 * | 11/2017 | Goeringer ............. H04L 9/06 |

(Continued)

FOREIGN PATENT DOCUMENTS

| CN | 106888097 A | 6/2017 |
| CN | 109074564 A | 12/2018 |

(Continued)

OTHER PUBLICATIONS

"Wang, Inter-Bank Payment System on Enterprise Blockchain Platform, Sep. 2018, IEEE, pertinent pp. 615-621" (Year: 2018).*

(Continued)

*Primary Examiner* — Bennett M Sigmond
*Assistant Examiner* — Bhavin D Shah
(74) *Attorney, Agent, or Firm* — CHIP LAW GROUP

(57) ABSTRACT

An example operation may include one or more of receiving gridlock resolution messages from participants of a gridlocked payment network, each gridlock resolution message comprising a subset of local payments to be performed and a zero-knowledge proof that indicates that the subset of local payments creates a positive post-balance for the respective participant without revealing the positive-post balance, determining whether zero knowledge proofs included in the gridlock resolution messages are valid, aggregating the subsets of local payments to be performed from the gridlock resolution messages to create a global nettable set of payments, and publishing the global nettable set via a data block among a hash-linked chain of data blocks of a distributed ledger accessible to the participants.

15 Claims, 17 Drawing Sheets

(56) References Cited

U.S. PATENT DOCUMENTS

| | | | |
|---|---|---|---|
| 2018/0204213 A1* | 7/2018 | Zappier | H04L 63/10 |
| 2018/0204216 A1 | 7/2018 | Jayaram et al. | |
| 2019/0019186 A1* | 1/2019 | Falah | G06Q 20/223 |
| 2019/0164153 A1* | 5/2019 | Agrawal | H04L 9/3218 |
| 2019/0244290 A1* | 8/2019 | Massacci | G06F 21/64 |
| 2020/0193425 A1* | 6/2020 | Ferenczi | H04L 63/12 |
| 2022/0318807 A1 | 10/2022 | Rohlfing et al. | |

FOREIGN PATENT DOCUMENTS

| | | |
|---|---|---|
| CN | 109257182 A | 1/2019 |
| CN | 111754343 A | 10/2020 |

OTHER PUBLICATIONS

Anonymous, "E-Settlement System Bank Interface", Bank of Finland 2001-2002.

Brown et al. "Corda: A Distributed Ledger." R3 (2016).

Fugal, et al. "A proposal for a decentralized liquidity savings mechanism with side payments." R3 (2018).

Gurumurthy et al., State Bank Staff College 2006.

Kiviat, "Beyond bitcoin: Issues in regulating blockchain tranactions." Duke LJ 65 (2015): 569.

Lund et al., "Central bank digital currencies", omfif.org, 2018.

Wang et al. "Inter-Bank Payment System on Enterprise Blockchain Platform." 2018 IEEE 11th International Conference on Cloud Computing (CLOUD). IEEE, 2018.

The State Intellectual Property Office of People's Republic of China, "The Second Office Action" Jul. 11, 2024, 9 Pages, CN Application No. 202010189395.X.

Project Jasper. "A Canadian Experiment with Distributed Ledger Technology for Domestic Interbank Payments Settlement", White Paper prepared by: Payments Canada, Bank of Canada 1 and R3, Nov. 28, 2018, 70 pages, https://web.archive.org/web/20181128054021/ https://www.payments.ca/sites/default/files/29-Sep-17/jasper_report_eng.pdf.

* cited by examiner

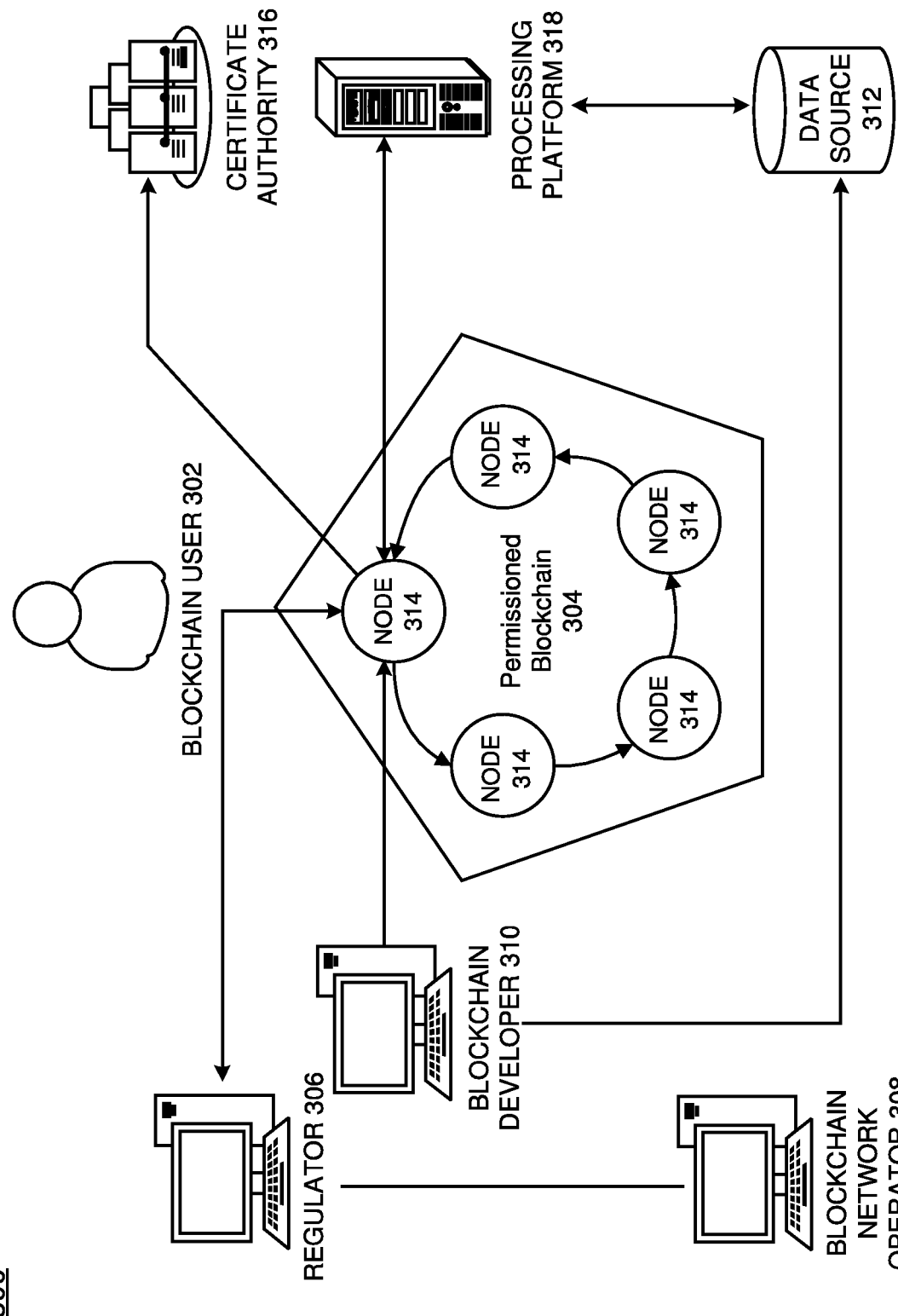

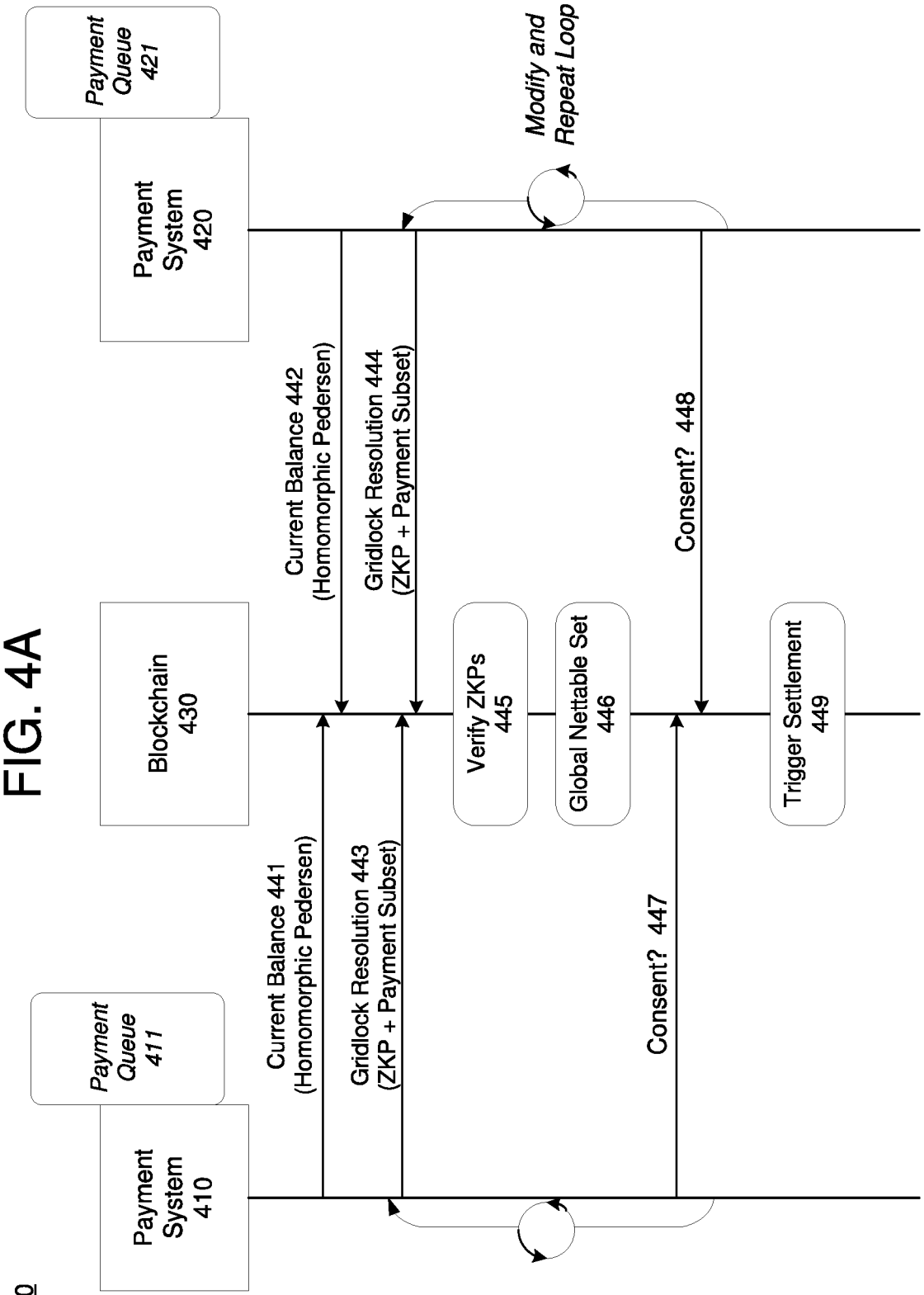

FIG. 4B

Gridlock Resolution 443/444

460 - Local Payment Subset
Sender ID, Receiver ID, Amount (Homomorphic Pedersen)
   ↳ 461      ↳ 462         ↳ 463

470 - ZKP Range
A) Post-Balance is >0, and
B) Next Highest Priority Creates Post Balance <0

PRIVACY-PRESERVING GRIDLOCK RESOLUTION

TECHNICAL FIELD

This application generally relates to a blockchain process, and more particularly, to a gridlock resolution protocol in which blockchain can be used to fairly determine a global subset of payments that can be processed to resolve gridlock while preserving the privacy of sensitive banking information.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Meanwhile, gridlock is a situation that occurs in an interbank payment network when all participants don't have sufficient liquidity to settle their payment instructions because several payments each await settlement of the others. In payment systems where a central bank (central authority) can take control, the system must always rely on the central bank for gridlock resolution which leads to the single-point-of-failure problem mentioned above, and can create overburden on the central bank infrastructure. Furthermore, in cross-border payment systems or other more general payment systems, there is not a single central bank to entrust gridlock resolution. As such, what is needed is a gridlock resolution solution that overcomes these drawbacks and limitations.

SUMMARY

One example embodiment provides a system that includes a processor and memory, wherein the processor is configured to perform one or more of a network interface configured to receive gridlock resolution messages from participants of a gridlocked payment network, where each gridlock resolution message comprises a subset of local payments to be performed and a zero-knowledge proof that indicates that the subset of local payments creates a positive post-balance for the respective participant but which does not reveal the positive-post balance, and a processor configured to determine whether zero knowledge proofs included in the gridlock resolution messages are valid, aggregate the subsets of local payments to be performed from the gridlock resolution messages to create a global nettable set of payments, and publish the global nettable set via a data block among a hash-linked chain of data blocks of a distributed ledger accessible to the participants.

Another example embodiment provides a method that includes one or more of receiving gridlock resolution messages from participants of a gridlocked payment network, each gridlock resolution message comprising a subset of local payments to be performed and a zero-knowledge proof that indicates that the subset of local payments creates a positive post-balance for the respective participant without revealing the positive-post balance, determining whether zero knowledge proofs included in the gridlock resolution messages are valid, aggregating the subsets of local payments to be performed from the gridlock resolution messages to create a global nettable set of payments, and publishing the global nettable set via a data block among a hash-linked chain of data blocks of a distributed ledger accessible to the participants.

A further example embodiment provides a non-transitory computer readable medium comprising instructions, that when read by a processor, cause the processor to perform one or more of receiving gridlock resolution messages from participants of a gridlocked payment network, each gridlock resolution message comprising a subset of local payments to be performed and a zero-knowledge proof that indicates that the subset of local payments creates a positive post-balance for the respective participant without revealing the positive-post balance, determining whether zero knowledge proofs included in the gridlock resolution messages are valid, aggregating the subsets of local payments to be performed from the gridlock resolution messages to create a global nettable set of payments, and publishing the global nettable set via a data block among a hash-linked chain of data blocks of a distributed ledger accessible to the participants.

BRIEF DESCRIPTION OF THE DRAWINGS

FIG. 3A is a diagram illustrating a permissioned network, according to example embodiments.

FIG. 4A is a diagram illustrating a communication process for gridlock resolution, according to example embodiments.

FIG. 4B is a diagram illustrating a gridlock resolution message provided from a participant of the payment network, according to example embodiments.

DETAILED DESCRIPTION

Figure 1:
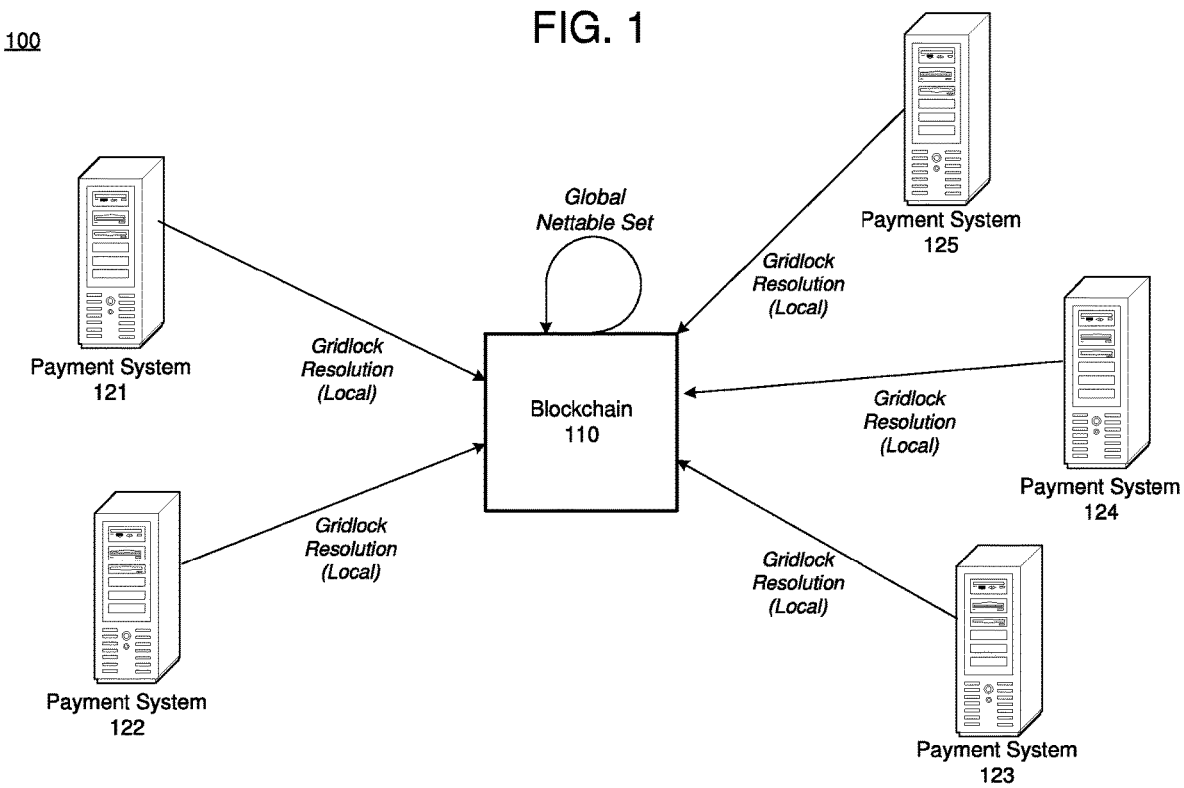
FIG. 1 is a diagram illustrating a blockchain network for gridlock resolution according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for gridlock resolution via blockchain which preserves privacy of the entities involved.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains often involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to a blockchain-based system which can resolve a gridlock when it happens within an interbank payment network or similar payment systems (e.g., cross-border payment systems, etc.) The system implements a distributed protocol for gridlock resolution. In interbank payment systems or similar systems with several participants, gridlock is a situation in which all participants don't have sufficient liquidity to settle their payment instructions because several payments each await settlement of others. Gridlock resolution is a process of finding subsets of payment instructions that can be settled simultaneously on a net basis, without causing deficiency for any participant.

The blockchain may be managed by peers (e.g., banks, etc.) in the payment network. Therefore, each bank may have its own access to the blockchain where global netting and gridlock resolution are executed by smart contracts. When gridlock occurs, each participating bank may propose a gridlock resolution based on their own local payment sets such that their proposal does not create a post-negative balance for the bank. The gridlock resolutions may be passed to the blockchain and processed via a smart contract. To prove a post-positive balance without revealing an amount of the account balance, each participant may also provide a zero-knowledge proof (ZKP) which proves that the payment balance is greater than zero (true) as a result of the subset of payments.

The smart contract may verify the ZKPs of each of the participants, aggregate the local payment subsets, and publish a combined (union) nettable set, also referred to herein is a global nettable set. If a participant disagrees with the global nettable set (i.e., it creates a post-negative balance for the participant), the participant notifies the smart contract and the process repeats beginning with modified gridlock resolutions. In response, each participant can remove/modify payments in their local subset of payments to address the post-negative balance of the other participants. The smart contract may then aggregate the modified local subsets of payments and publish the aggregate. This process can repeat until all participants approve of the global nettable set, which is referred to as a global optimum nettable set.

Some benefits of the instant solutions described and depicted herein include immutability and accountability because the solution fundamentally relies on the fact that the commitments (account balance (concealed with a homomorphic Pedersen commitment), payment message and gridlock resolution proposals are published on the blockchain and are immutable. Furthermore, smart contract is used to record/track the changes made to the data and to verify the integrity of the data. For example, the smart contract can check that the account balance is updated correctly and the gridlock resolution proposals are correct.

An additional challenge solved by the example embodiments is a method to hide the content (account balance, payment message amount) via Pedersen commitment and to design the gridlock resolution protocol to work with hidden content and using zero knowledge proof to make the proposal verifiable with hidden content. Furthermore, using the decentralized/distributed nature of blockchain, the system eliminates the need for a single trusted entity to manage the payment system and do gridlock resolution. In addition, consensus ensures fairness by allowing all parties to endorse on the global optimal set of payments that can be settled through netting and the correctness of the settlement. Furthermore, the examples embodiments cannot be implemented on traditional database because it requires consensus mechanism of blockchain to guarantee the fairness of the settlement.

FIG. 1 illustrates a blockchain network 100 for gridlock resolution according to example embodiments. In this example, a plurality of payment systems 121-125 are connected to each other via a network (e.g., private network, the Internet, etc.) and implement a blockchain 110 which can be replicated among the blockchain peers 121-125. In this example, the payment systems 121-125 also function as blockchain peers. The payment systems 121-125 may be banks or other financial institutions that send/receive payments to/from each other.

When gridlock occurs among the payments systems 121-125, each payment system may propose its own respective gridlock resolution based on its payment queue. Each gridlock resolution may include a local subset of payments to be performed and a proof that such payments will not create a local negative balance. For example, each of the payment systems 121-125 may generate a subset of payments from a larger set stored in a queue of the participant which can be processed without creating a negative balance for the payment system. The priority of payments included in the subset may be based on the order in the payment queue which is based on the order in which they were received by the respective payment system. In addition, the payment systems 121-125 may each provide their own form of proof that their local payment subset does not create a negative post-balance for the respective payment system.

To conceal or otherwise hide sensitive account balance information of the payment systems 121-125, each payment system may generate a zero-knowledge range proof that proves a number (post-balance) is within a certain range, say [0,N], without revealing the actual number. In the example embodiments, the account balances of the payment systems 121-125 may be hidden in Pederson commitments, i.e., not in plaintext. Assume that payment system 121 generates its local subset of payments (most possible payments) that do not create a negative balance for the payment system 121. In order for the network (other payment systems 122-125) to verify that the gridlock proposal of a payment system 121 is valid, i.e., the post balance will be in the range of [0,MAX] (not negative), without revealing how much the respective payment system 121 actually owns, the payment system 121 may provide a zero-knowledge range proof. In the example embodiments, the zero-knowledge range proof will prove that the payment system's 121 post balance published in the form of Pederson commitment on the blockchain 110, is not negative. It helps other participants (payment systems 122-125) validate the proposed subset of local payments while keeping the account balance of the payment system 121, a secret. Each of the payment systems 121-125 may create the same ZKP.

The gridlock resolutions may be passed to the blockchain 110 and processed via a smart contract of the blockchain 110. The smart contract may verify the ZKPs of the payment systems 121-125 and create a global nettable set of payments from the local subsets. The smart contract may then publish the global nettable set, by storing the global nettable set in a block of the blockchain 110. In response, each of the payment systems 121-125 may review the published global nettable set and determine whether the global nettable set is acceptable (i.e., that the global nettable set does not create a negative post balance for the respective payment system.) If all of the payment systems 121-125 agree on the global nettable set, an endorsement may be performed, and the smart contract of the blockchain 110 can trigger settlement of the global nettable set. If any of the payment systems 121-125 do not agree with the global nettable set (the global nettable set results in a negative post-balance), then the payment system can reject (or deny consent) to the global nettable set, and the gridlock resolution process may be repeated with modifications to the local subsets of payments. This process can iteratively repeat until an optimum global nettable set is achieved.

Figure 2A:
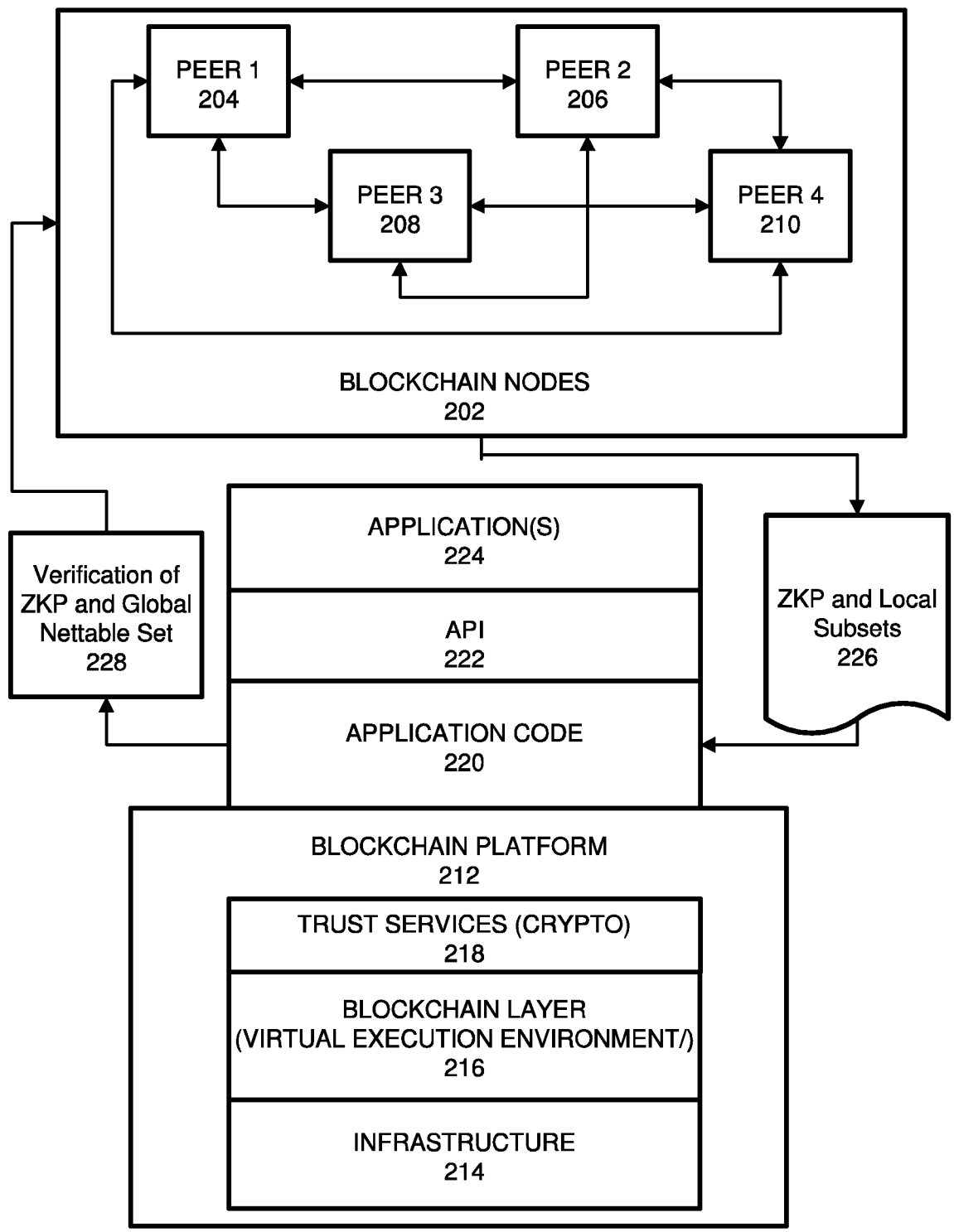
FIG. 2A is a diagram illustrating an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the smart contract may extract ZPK data and local payment subsets from and store the data (e.g., virtual machines) in the blockchain layer 216. The result 228 may include verification of the ZKP and an aggregation of the local subsets of payments into a global nettable set. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
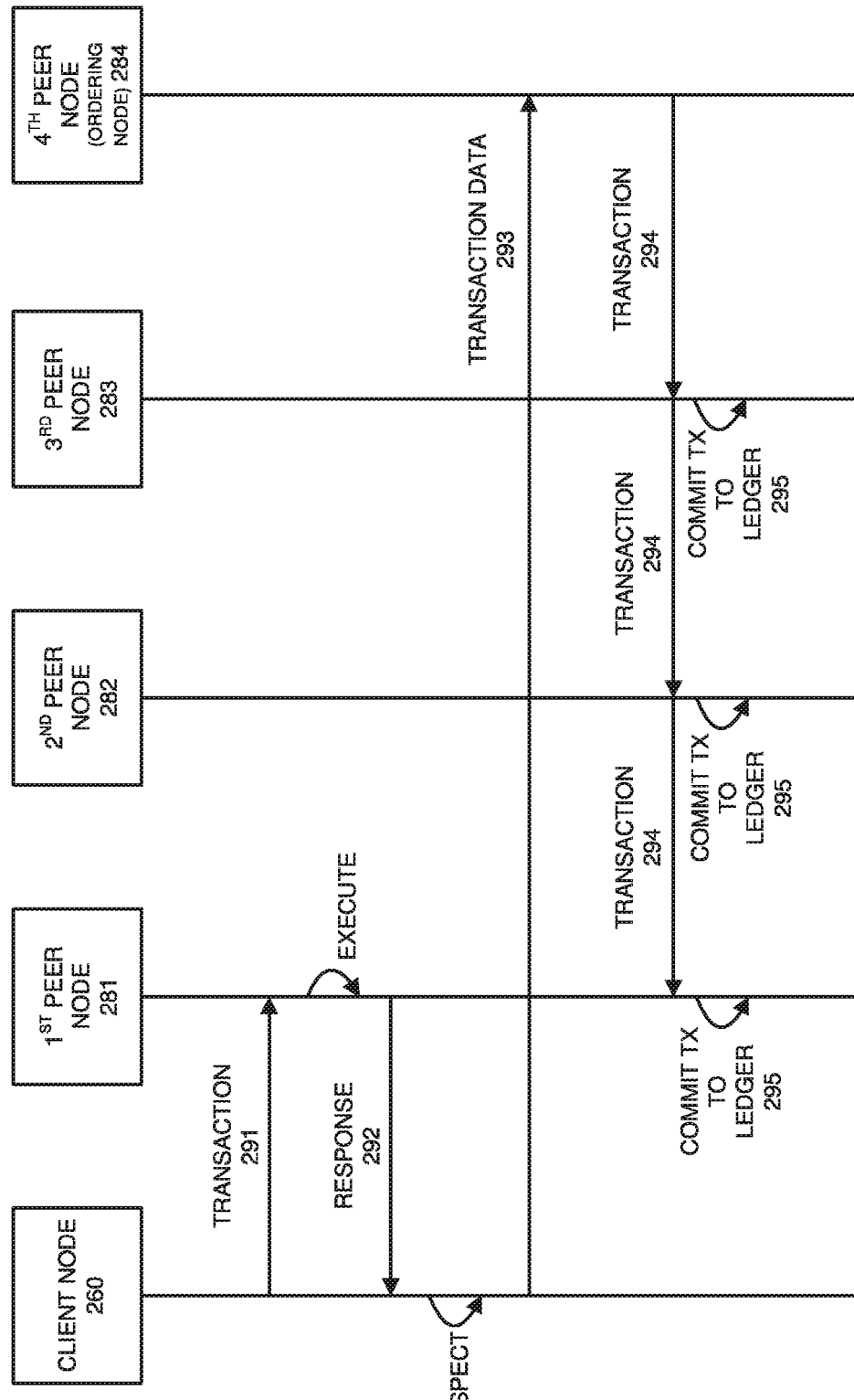
FIG. 2B is a diagram illustrating a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
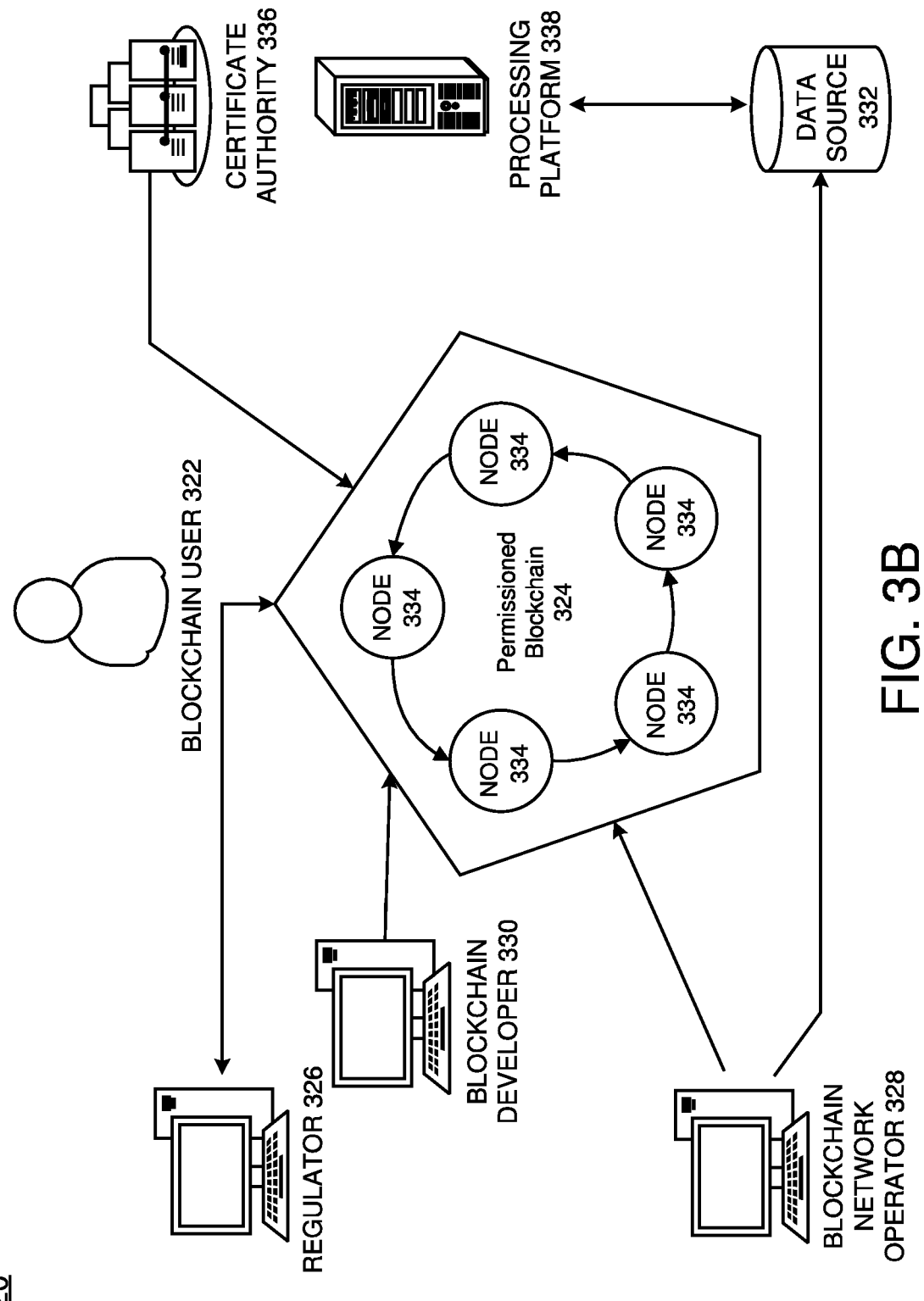
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

FIG. 4A illustrates a communication process 400 for gridlock resolution, according to example embodiments, and FIG. 4B illustrates a gridlock resolution message 443/444 provided from a participant of the payment network, according to example embodiments. In the example of FIG. 4A, for simplicity two payment systems 410 and 420 participate in an interbank payment network and implement a blockchain 430. It should be appreciated that the payment network and the gridlock resolution protocol may be performed by more than two payment systems, but just two are shown here for purposes of convenience. During an initial stage, in 441 and 442, the payment systems 410 and 420 store account details on the blockchain 430, respective. For example, the account details may include a current balance of the respective payments systems (in Pedersen Commitment, not in plaintext), currency type, an owner ID, and the like. Each payment system 410 and 420 may periodically or on-demand update the blockchain 430 with current account details.

When a gridlock occurs, an iterative process that includes 443-449 may be performed in a loop until both payment systems 410 and 420 agree/consent to a global optimum nettable set. This global optimum nettable set is achieved when both payment systems 410 and 420 in this example can process the payments in the global optimum nettable set and still have a positive post-balance. To begin the loop, in 443 and 444, the payment systems 410 and 420 may submit a gridlock resolution message to the blockchain 430, respectively. An example of the gridlock resolution message 443/444 is shown in the example of FIG. 4B. Here, the gridlock resolution message 443/444 includes a local payment set 460. In this example, the local payment set may include local payments at the respective payment systems without regard for the other payment(s) in the network. For example, payment system 410 may extract pending payment messages from a payment queue 411 and determine a subset that creates a post-positive balance for the payment system 410. Likewise, payment system 420 may extract pending payment messages from payment queue 421 and determine a local subset that creates a post-positive balance for the payment system 420. For each payment message included in the local payment set 460, the respective payment system may provide various attributes 461, 462, 463, and the like, which include a sender ID, a receiver ID, and a payment amount (concealed with a homomorphic Pedersen commitment).

The homomorphic Pedersen commitment scheme is a cryptographic primitive that allows one to commit to a chosen value while keeping it hidden to others, with the ability to reveal the committed value later. Homomorphic means that we can conduct addition and multiplication on commitments as if we conduct these math operations on plaintext values and then create a commitment of the result. In the example embodiments, payment systems may use Pederson commitment to hide the account balance and payment amount. Since Pederson commitment is additive homomorphic, which enables the account balance to update with the payment messages using the commitments easily, without the need to know the committed value (plaintext value).

In addition, the gridlock resolution message 443/444 may include a zero-knowledge proof range 470 provided by a respective payment system. The zero-knowledge range proof 470 is a proof that proves a number is within a certain range, say [0,N], without revealing the number. In the example embodiments, the participant's balances are hidden in Pederson commitments, i.e., not in plaintext. Thus, in order for the network (peers) to verify that the gridlock proposal of a participant is valid, i.e., the post balance of him will be in the range of [0,MAX] (not negative), without revealing how much he actually owns, he will need to provide this kind of zero-knowledge range proof. Therefore, the zero-knowledge range proof 470 will prove that the participant's post balance published in the form of Pederson commitment on blockchain, is not negative. It helps other participants validate his proposal while keeping his account balance secret. The zero-knowledge proof range 470 also provides proof that a next highest priority payment in the queue of the respective payment system will create a negative balance. Therefore, this ensures that each payment system is submitting their maximum amount of payment messages that can be processed without creating a negative post-balance.

In 445, the smart contract of the blockchain 430 may verify the ZKPs of each of the payment systems 410 and 420, respectively, which are included in the gridlock resolution messages 443 and 444, respectively. Once verified, the smart contract may generate a global nettable set in 446 which includes a combined set of payments (i.e., a union of the local payment subsets from payment systems 410 and 420) which are provided in the gridlock resolution messages 443 and 444. Furthermore, in 446 the smart contract may publish the global nettable set for review by the payment systems 410 and 420. If both payment systems 410 and 420 agree to the global nettable set (i.e., a post-positive balance exists) the payment systems 410 and 420 provide consent in 447 and 448. However, if a negative balance exists for at least one of the payment systems 410 and 420, then the messages in 447 and 448 will not be a complete consensus because at least one participant will not consent. Therefore, the loop can be repeated beginning with steps 443 and 444 where new gridlock resolutions are provided with a modification to the local subsets of payments to address any negative post balance.

Gridlock resolution is achieved through two key techniques—publicly verifiable proposal by each participant and smart contract to aggregate all the proposals. Through recursive interactions of these two, the example embodiments achieve a global optimal nettable set. In particular, at each iteration, every participant will submit to blockchain their own nettable set solution without considering other participants' feasibility. These proposals are publicly verified to ensure that each participant includes maximum number (or maximum amount) of payments in their proposals. Then smart contract will aggregate all these proposals and publish a current nettable set. Each participant will check against the current nettable set and submit new proposal if this set is not feasible for them. Otherwise, they will consent to the current nettable set. This process goes on until all participants consent to the same nettable set and hence the final global optimal nettable set is achieved.

The gridlock resolution protocol finds an optimal nettable set, defined as nettable, which is a subset of all that can be settled simultaneously on a net basis, without causing deficiency for each participant. The nettable may be initialized to be equal to the set of all payment messages at the beginning of the iteration. In each iteration, each participant will compute its post-balance by adding to his current balance with all its incoming payment messages, excluding any which is not in the nettable of a last iteration. Each participant will then calculate a proposal set, which is the largest subset of his own outgoing payment message queues (picked according to priority), with the constraint that the post balance is non-negative. Each participant will also provide a zero-knowledge range proof to prove that the post balance is non-negative with this proposal set. Each participant will also provide another zero-knowledge range proof to prove that the post balance is negative if one more (the next highest priority) message is added to the proposal set. Each participant will submit the proposal to the blockchain. Smart contract will verify the proposals by checking the zero knowledge proofs and add the proposal to the ledger. At the end of each iteration, smart contract will calculate the new nettable set by combining (calculating a union of) all the proposal sets from each participant. This process is repeated until convergence, i.e., the nettable set does not change any more.

Figure 5:
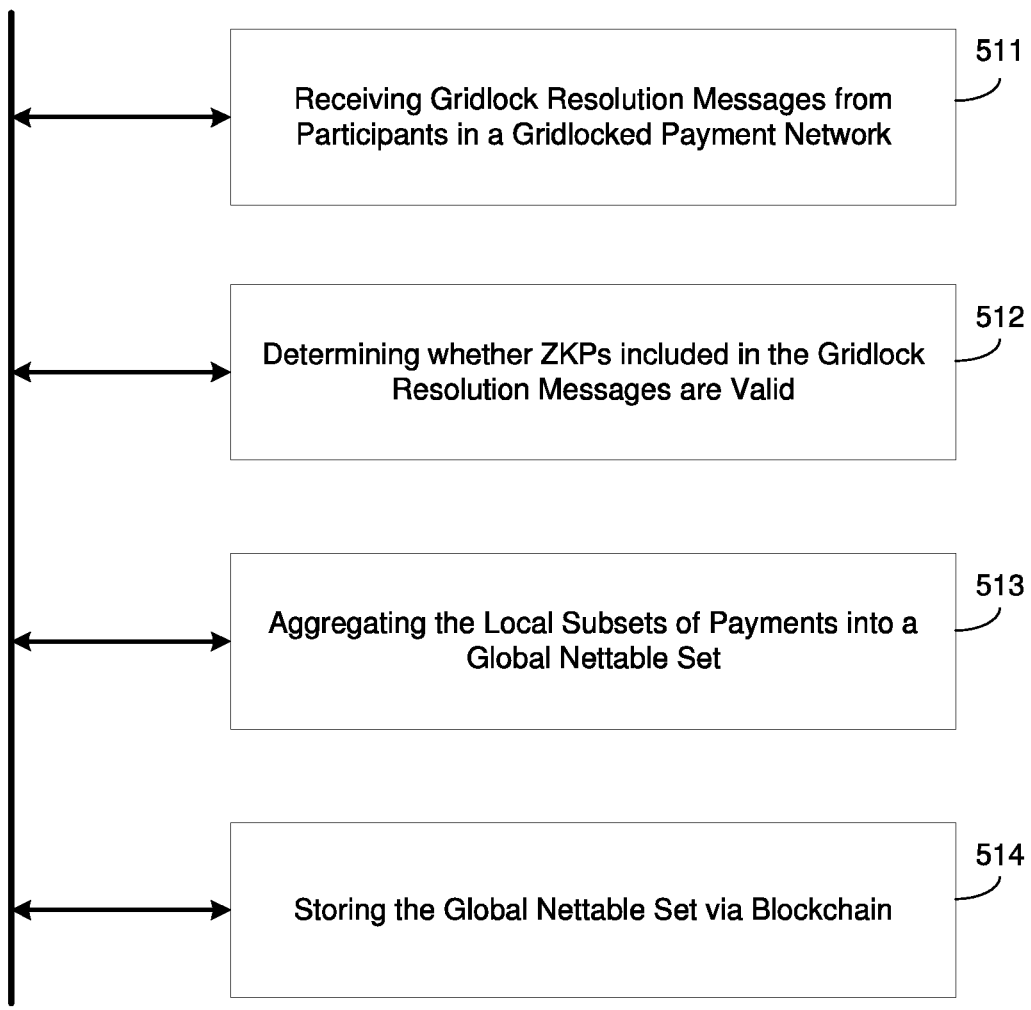
FIG. 5 is a flow diagram illustrating a method for resolving gridlock in a payment network, according to example embodiments.

FIG. 5 illustrates a method 500 for resolving gridlock in a payment network, according to example embodiments. Referring to FIG. 5, in 510, the method may include receiving gridlock resolution messages from participants of a gridlocked payment network. For example, each gridlock resolution message may include a subset of local payments to be performed by the respective participant and a zero-knowledge proof that indicates that the subset of local payments creates a positive post-balance for the respective participant without revealing the positive-post balance. The subset of local payments may be generated by each participant without consideration of other participants in the payment network.

In 520, the method may include determining whether zero knowledge proofs included in the gridlock resolution messages are valid. For example, the zero-knowledge proof may be a proof that the post-balance is greater than zero after settlement of the subset of local payments. The smart contract can verify whether this is true using a verification program. In 530, the method may include aggregating the subsets of local payments to be performed from the gridlock resolution messages to create a global nettable set of payments. For example, the smart contract may create a union of all local subsets to create a global subset of payments to be performed. In 540, the method may include publishing the global nettable set via a data block among a hash-linked chain of data blocks of a distributed ledger accessible to the participants. For example, the smart contract may store the global nettable set via blockchain.

In some embodiments, in response to receiving a consensus of the participants that the global nettable set is accepted, the method may further include triggering settlement of the global nettable set of payments. In some embodiments, the method may further include storing an identification of the payments included in the global nettable set via the data block among the hash-linked chain of data blocks. According to various embodiments, payment amounts included in the subsets of local payments to be settled may be concealed using a Pedersen commitment.

In some embodiments, the zero-knowledge proof further indicates that a highest priority payment not included in the subset of local payments creates a negative post-balance for the respective participant without revealing the negative post-balance. In some embodiments, the method may further include performing a next iteration of the receiving, the determining, the aggregating, and the publishing, in response to in response to lack of global consent from the participants to the global nettable set. These steps may be continuously performed in a loop until the global nettable set is achieved (consensus of all participants). In this example, the performing of the next iteration may include receiving new gridlock resolution messages from the participants of the payment network comprising modified subsets of local payments based on the published global nettable set. In addition, the performing of the next iteration may include aggregating the modified subsets of local payments and publishing the aggregation via another data block among the hash-linked chain of data blocks.

Figure 6A:
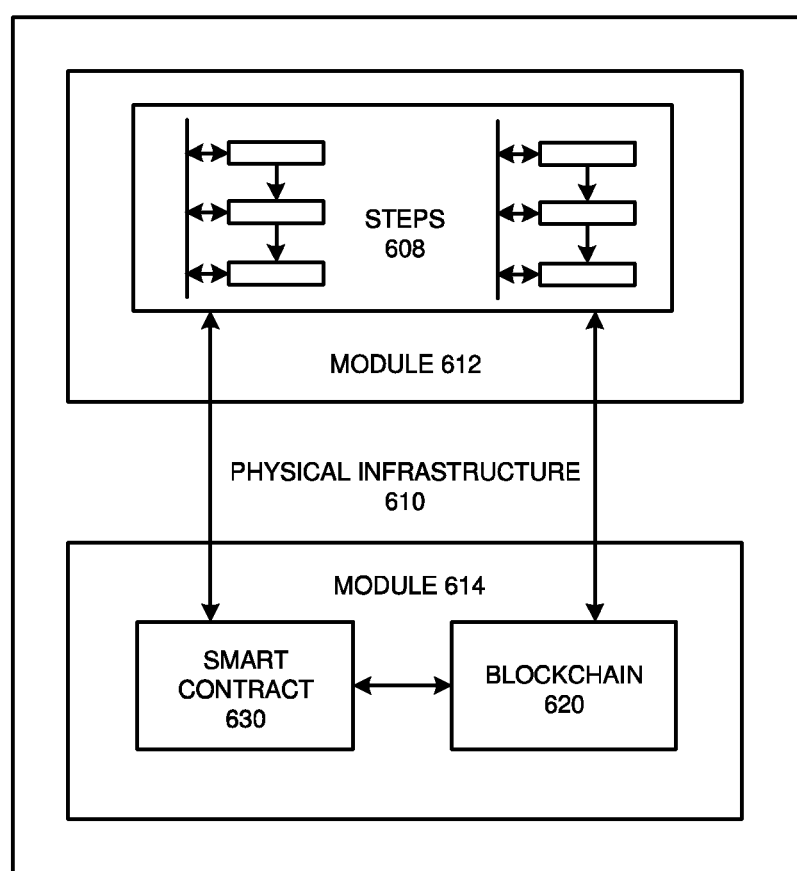
FIG. 6A is a diagram illustrating an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
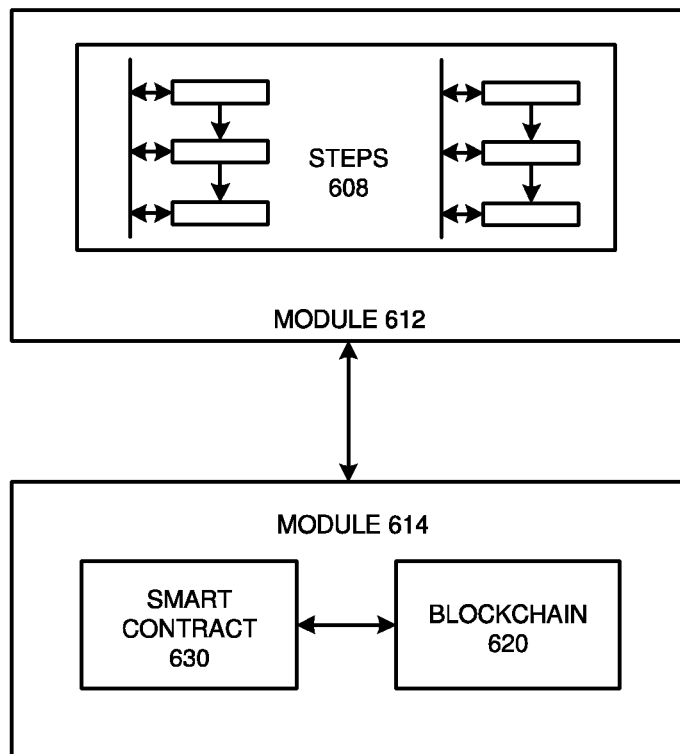
FIG. 6B is a diagram illustrating another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
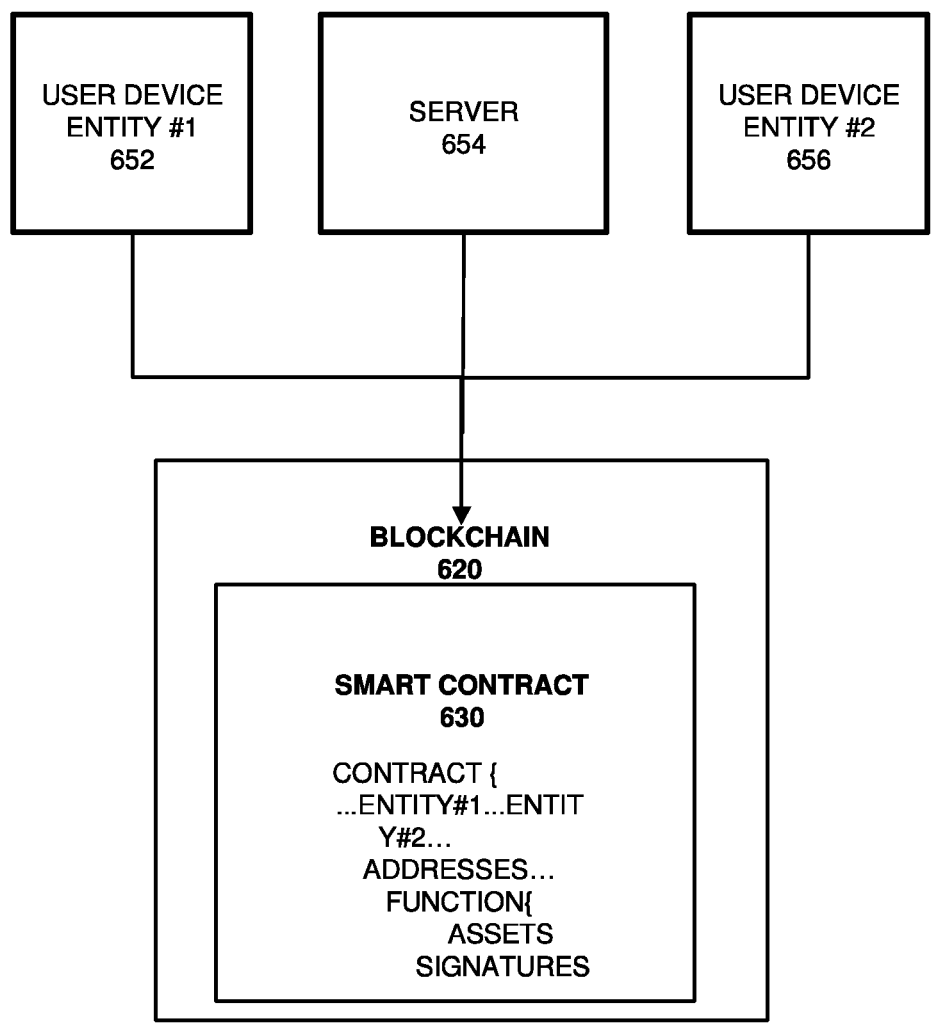
FIG. 6C is a diagram illustrating a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
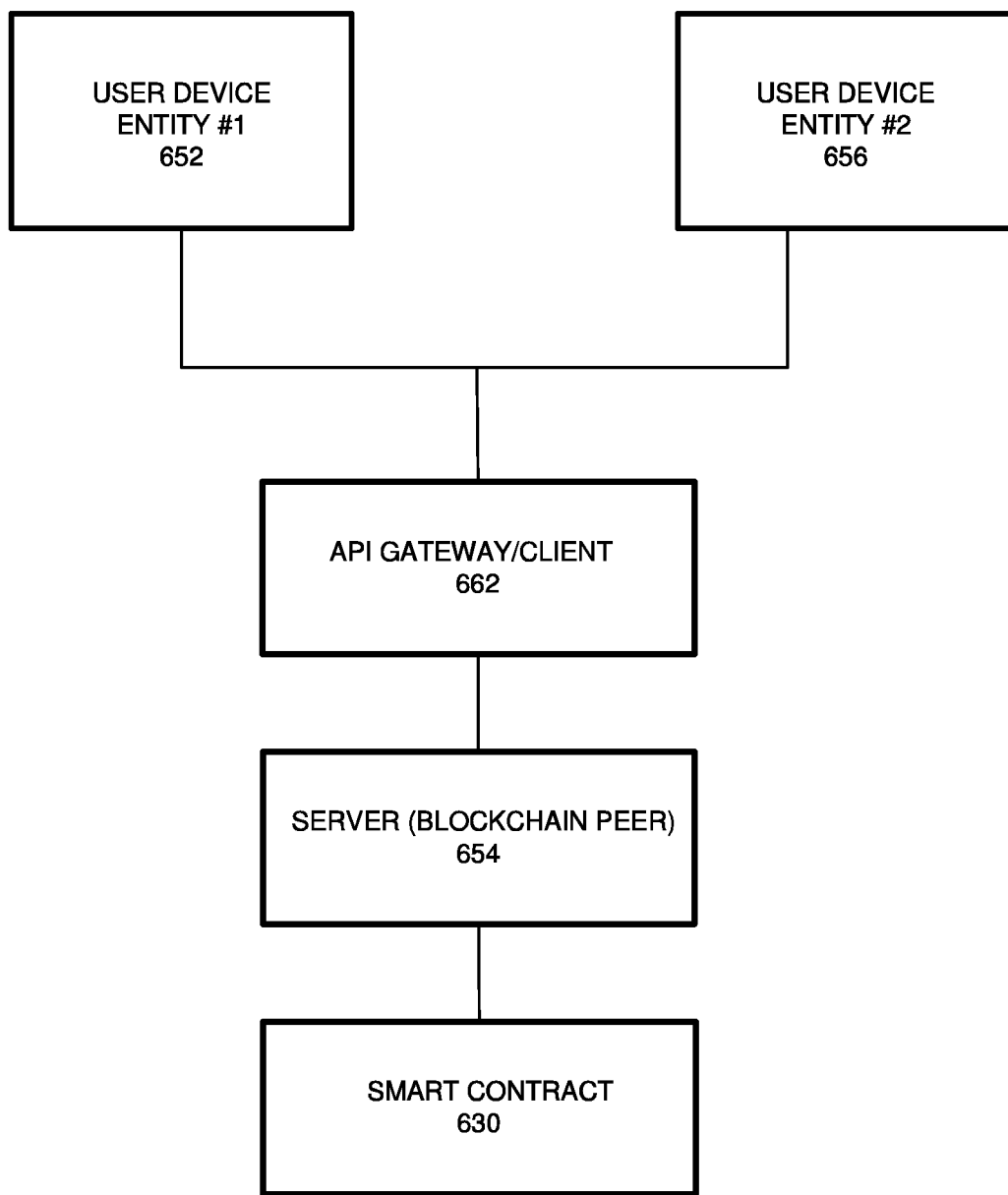
FIG. 6D is a diagram illustrating yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
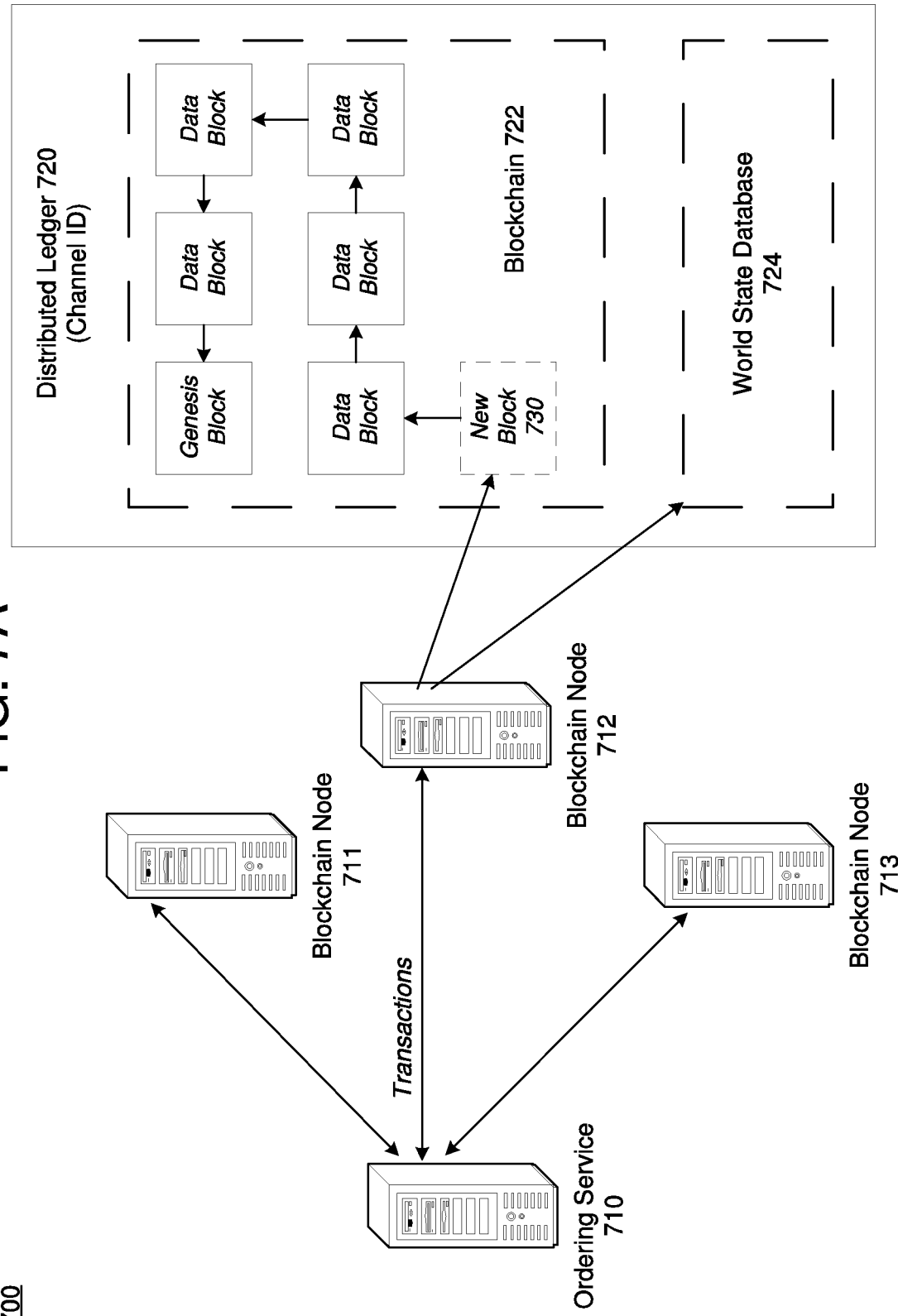
FIG. 7A is a diagram illustrating a process for a new block being added to a distributed ledger, according to example embodiments.
Figure 7B:
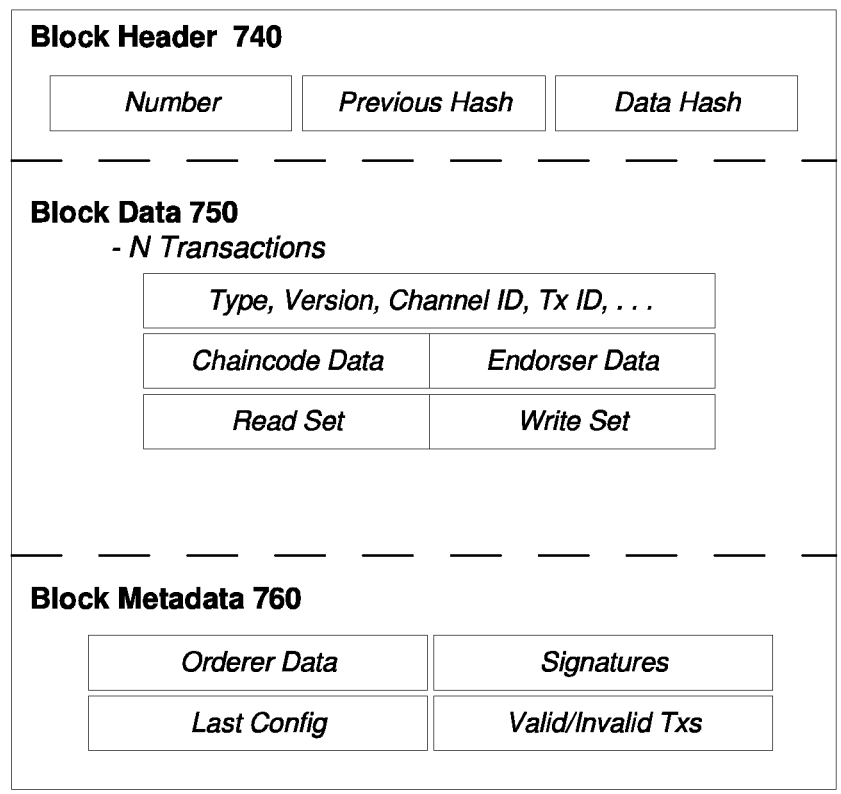
FIG. 7B is a diagram illustrating contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
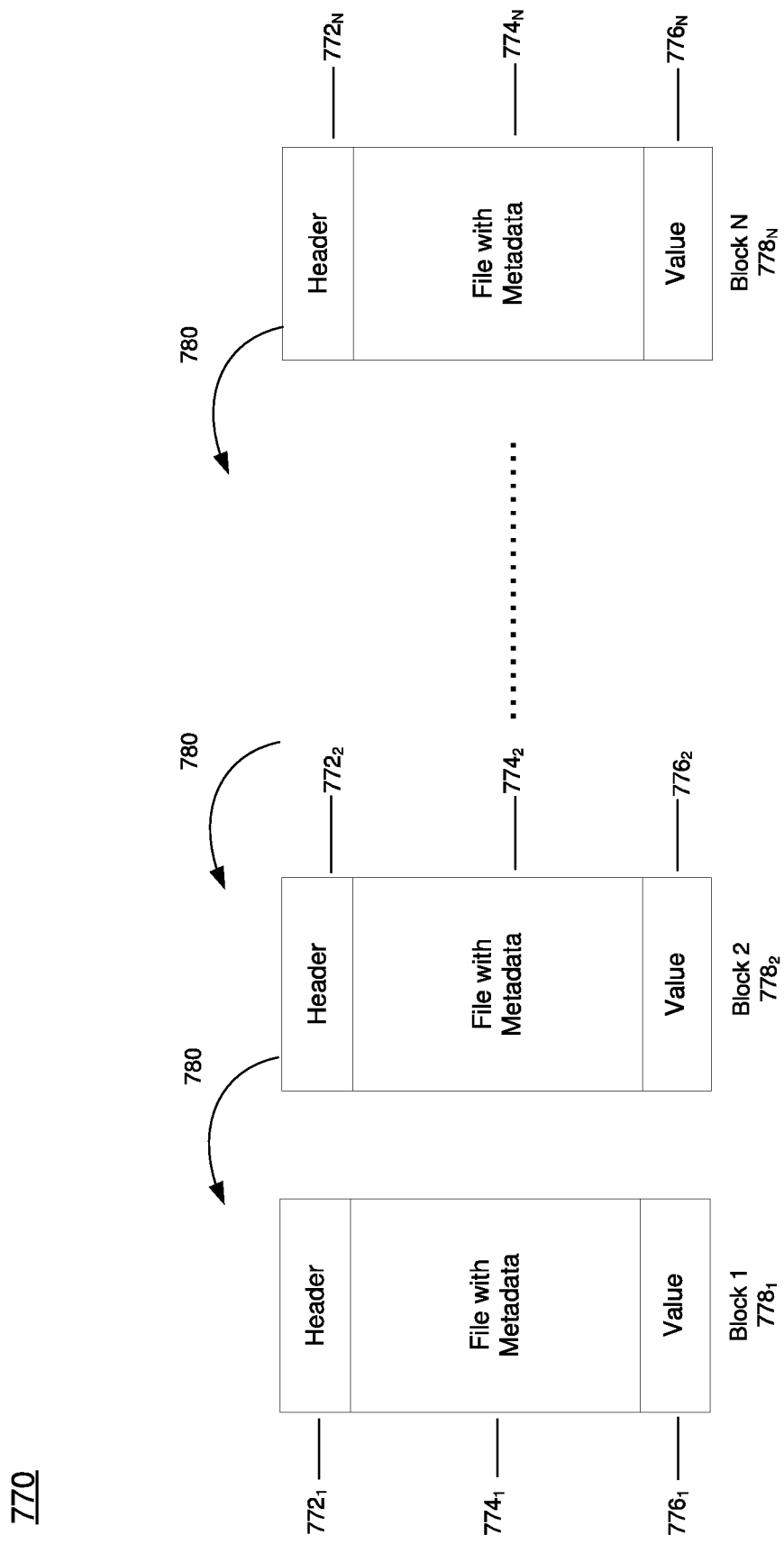
FIG. 7C is a diagram illustrating a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
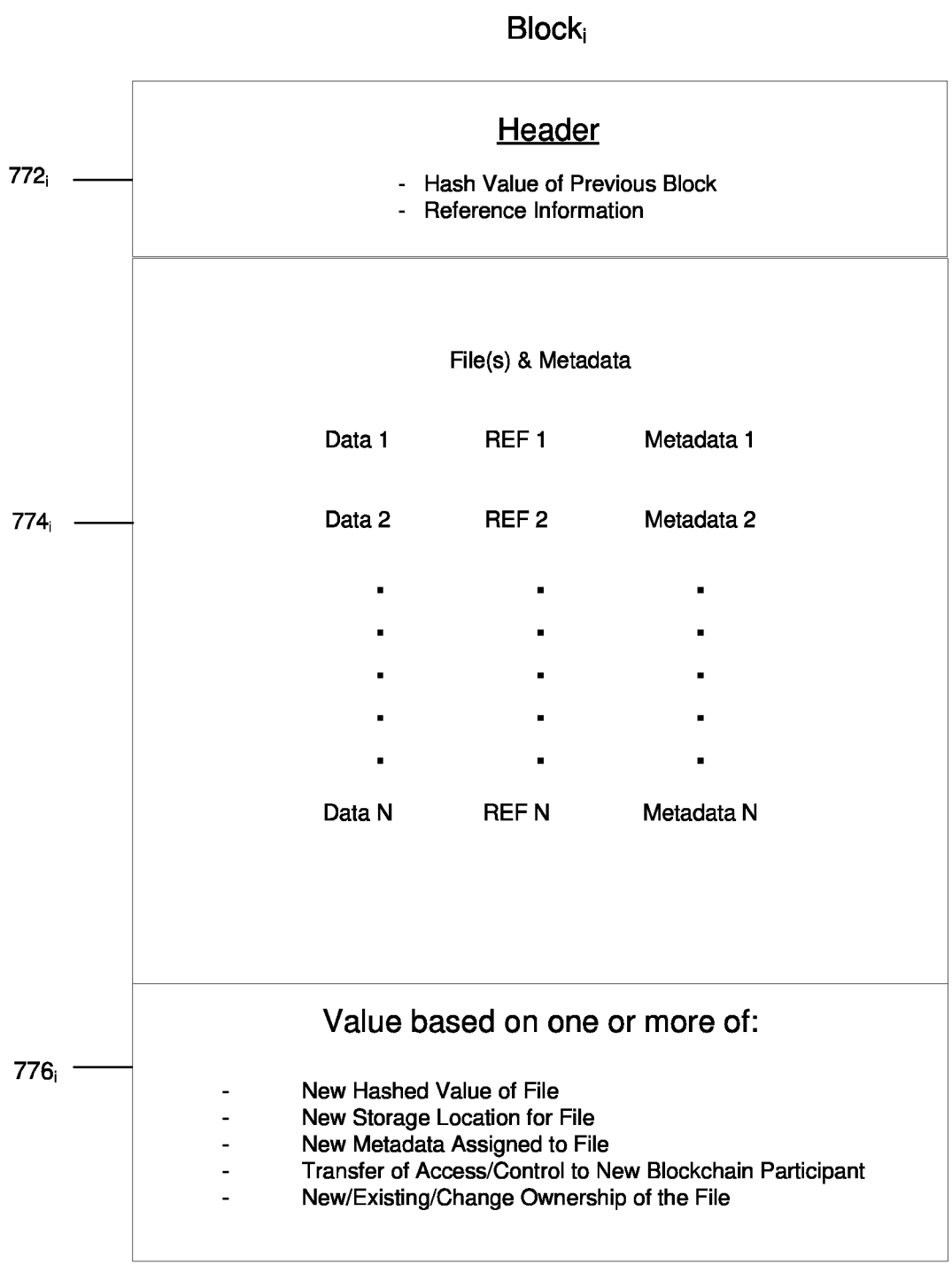
FIG. 7D is a diagram illustrating a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_1$, a file $774_1$, and a value $776_1$.

The header $772_1$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_1$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8:
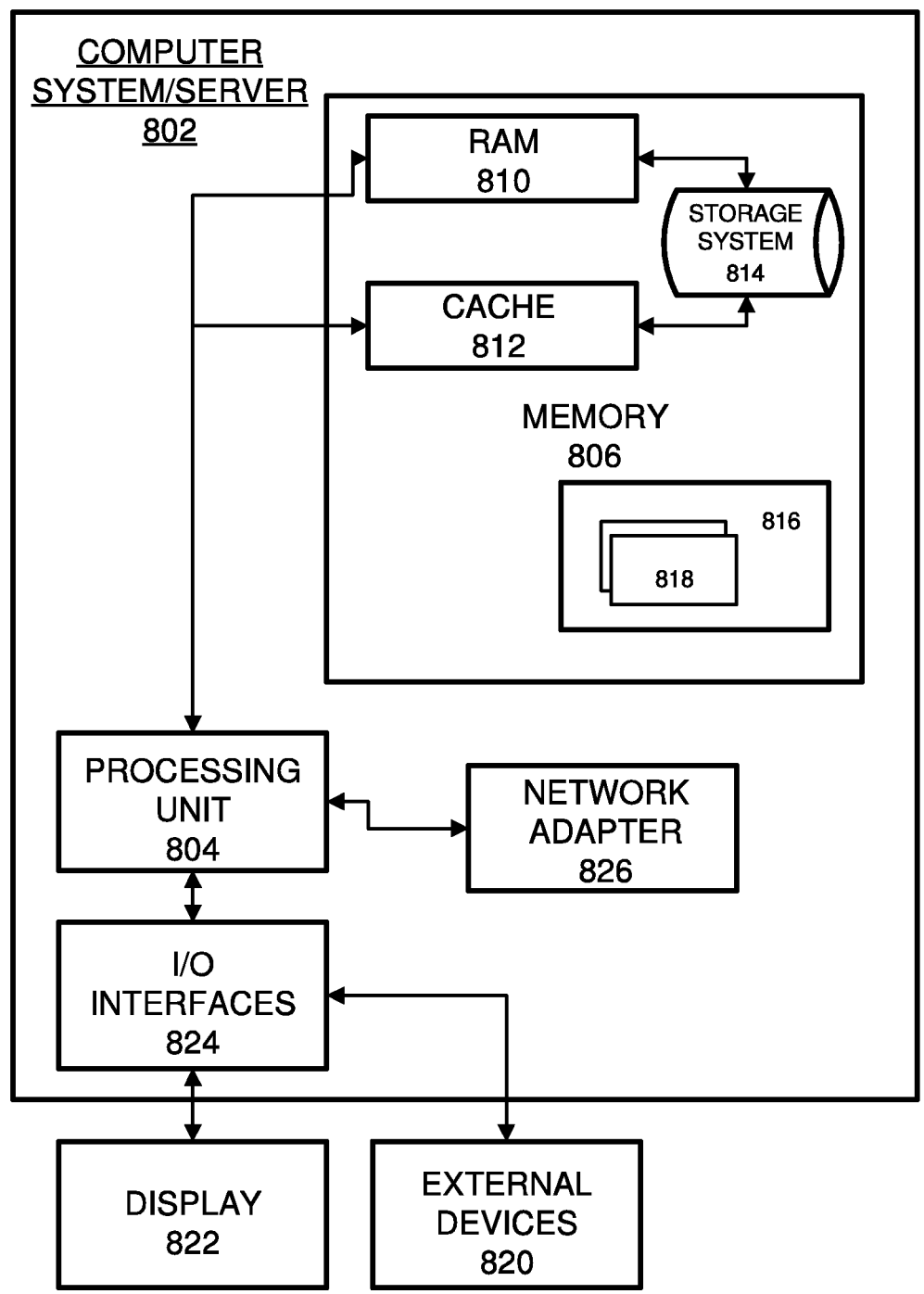
FIG. 8 is a diagram illustrating an example system that supports one or more of the example embodiments.

FIG. 8 illustrates an example system 800 that supports one or more of the example embodiments described and/or depicted herein. The system 800 comprises a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system for decentralized and privacy-preserving gridlock resolution in a blockchain-based network, the computing system comprising:
    a storage device configured to store a blockchain ledger; and
    a processor configured to execute a loop via a blockchain smart contract installed on the blockchain ledger, wherein the loop comprises:
        receive, via the blockchain smart contract, a plurality of gridlock resolution messages from a plurality of blockchain peers, respectively, wherein
            the plurality of blockchain peers corresponds to participants of a gridlocked payment network, and the plurality of gridlock resolution messages comprises:
                a plurality of subsets of local payments generated from a set of payments stored in a queue of the plurality of blockchain peers, respectively,
                a plurality of Pedersen commitments that conceals account balances of the plurality of blockchain peers, respectively and enables verification of net settlement conditions, and
                a plurality of zero-knowledge proofs that validates, that the plurality of subsets of local payments results in positive post-balances for accounts of the plurality of blockchain peers, respectively, without account data being revealed for the accounts of the plurality of blockchain peers;
        generate, via the blockchain smart contract, a global nettable set by aggregation of the plurality of subsets of local payments from the plurality of gridlock resolution messages, respectively;
        publish, via the blockchain smart contract, the global nettable set as a cryptographically secured block to the blockchain ledger;
        execute, via the blockchain smart contract, a decentralized blockchain consensus process with the plurality of blockchain peers based on the published global nettable set, wherein
            the execution of the decentralized blockchain consensus process is to verify and approve the global nettable set, and
            each blockchain peer of the plurality of blockchain peers evaluates whether the global nettable set satisfies certain local constraints;
        determine, via the blockchain smart contract, based on the decentralized blockchain consensus process, that at least one blockchain peer of the plurality of blockchain peers refuses to consent to the global nettable set;
        iteratively execute the loop, via the blockchain smart contract, based on the determination that the at least one blockchain peer refuses to consent;
        generate additional global nettable sets utilizing different gridlock resolution messages from the plurality of blockchain peers until each blockchain peer of the plurality of blockchain peers agrees to an optimum global nettable set via the decentralized blockchain consensus process;
        endorse the optimum global nettable set, via the blockchain ledger, based on the agreement of each blockchain peer of the plurality of blockchain peers to the optimum global nettable set; and
        trigger automatic execution of payments included in the optimum global nettable set to resolve the gridlocked payment network without requirement of a central authority.

2. The computing system of claim 1, wherein the processor is further configured to store an identification of the plurality of subsets of local payments via a data block on the blockchain ledger.

3. The computing system of claim 1, wherein payment amounts included in the plurality of subsets of local payments are concealed with the plurality of Pedersen commitments, respectively.

4. The computing system of claim 1, wherein the processor is further configured to perform a next iteration of the loop based on the determination that the at least one blockchain peer, of the plurality of blockchain peers, refuses to the consent to the global nettable set.

5. The computing system of claim 4, wherein
for the next iteration, the processor is further configured to receive new gridlock resolution messages from the plurality of blockchain peers, and
the new gridlock resolution messages comprise modified subsets of local payments.

6. The computing system of claim 5, wherein, for the next iteration, the processor is further configured to:
aggregate the modified subsets of local payments; and
commit the aggregation of the modified subsets of local payments to an additional data block on the blockchain ledger.

7. A method providing decentralized and privacy-preserving gridlock resolution in a blockchain-based network, the method comprising:
storing a blockchain ledger in a storage device;
executing a loop via a blockchain smart contract installed on the blockchain ledger, wherein the loop comprises:
receiving, via the blockchain smart contract, a plurality of gridlock resolution messages from a plurality of blockchain peers, respectively, wherein
the plurality of blockchain peers corresponds to participants of a gridlocked payment network, and
the plurality of gridlock resolution messages comprises:
a plurality of subsets of local payments generated from a set of payments stored in a queue of the plurality of blockchain peers, respectively,
a plurality of Pedersen commitments that conceals account balances of the plurality of blockchain peers, respectively and enables verification of net settlement conditions, and
a plurality of zero-knowledge proofs that validates, that the plurality of subsets of local payments results in positive post-balances for accounts of the plurality of blockchain peers, respectively, without account data being revealed for the accounts of the plurality of blockchain peers;
generating, via the blockchain smart contract, a global nettable set by aggregation of the plurality of subsets of local payments from the plurality of gridlock resolution messages, respectively;
publishing, via the blockchain smart contract, the global nettable set as a cryptographically secured block to the blockchain ledger;
executing, via the blockchain smart contract, a decentralized blockchain consensus process with the plurality of blockchain peers based on the published global nettable set, wherein
the execution of the decentralized blockchain consensus process is to verify and approve the global nettable set, and
each blockchain peer of the plurality of blockchain peers evaluates whether the global nettable set satisfies certain local constraints,
determining, via the blockchain smart contract, based on the decentralized blockchain consensus process, that at least one blockchain peer of the plurality of blockchain peers refuses to consent to the global nettable set;
iteratively executing the loop, via the blockchain smart contract, based on the determining that the at least one blockchain peer refuses to consent;
generating additional global nettable sets utilizing different gridlock resolution messages from the plurality of blockchain peers until each blockchain peer of the plurality of blockchain peers agrees to an optimum global nettable set via the decentralized blockchain consensus process;
endorsing the optimum global nettable set, via the blockchain ledger, based on the agreement of each blockchain peer of the plurality of blockchain peers to the optimum global nettable set; and
triggering automatic executing of payments included in the optimum global nettable set to resolve the gridlocked payment network without requirement of a central authority.

8. The method of claim 7, further comprising storing an identification of the plurality of subsets of local payments via a data block of the blockchain ledger.

9. The method of claim 8, wherein payment amounts included in the plurality of subsets of local payments are concealed using the plurality of Pedersen commitments, respectively.

10. The method of claim 7, further comprising performing a next iteration of the loop based on the determining that the at least one blockchain peer, of the plurality of blockchain peers, refuses to the consent to the global nettable set.

11. The method of claim 10, wherein
the performing of the next iteration comprises receiving new gridlock resolution messages from the plurality of blockchain peers, and
the new gridlock resolution messages comprise modified subsets of local payments.

12. The method of claim 11, wherein the performing of the next iteration further comprises:
aggregating the modified subsets of local payments; and
committing the aggregation of the modified subsets of local payments to an additional data block to the blockchain ledger.

13. A non-transitory computer readable medium comprising instructions that when read by a processor, cause the processor to perform a method, the method comprising:
storing a blockchain ledger in a storage device;
executing a loop via a blockchain smart contract installed on the blockchain ledger, wherein the loop comprises:
receiving, via the blockchain smart contract, a plurality of gridlock resolution messages from a plurality of blockchain peers, respectively, wherein
the plurality of blockchain peers corresponds to participants of a gridlocked payment network, and
the plurality of gridlock resolution messages comprises:
a plurality of subsets of local payments generated from a set of payments stored in a queue of the plurality of blockchain peers, respectively,
a plurality of Pedersen commitments that conceals account balances of the plurality of blockchain peers, respectively and enables verification of net settlement conditions, and
a plurality of zero-knowledge proofs that validates, that the plurality of subsets of local payments results in positive post-balances for accounts of the plurality of blockchain peers, respectively without account data being revealed for the accounts of the plurality of blockchain peers;
generating, via the blockchain smart contract, a global nettable set by aggregation of the plurality of subsets of local payments from the plurality of gridlock resolution messages, respectively;

publishing, via the blockchain smart contract, the global nettable set as a cryptographically secured block to the blockchain ledger;

executing, via the blockchain smart contract, a decentralized blockchain consensus process with the plurality of blockchain peers based on the published global nettable set, wherein
- the execution of the decentralized blockchain consensus process is to verify and approve the global nettable set, and
- each blockchain peer of the plurality of blockchain peers evaluates whether the global nettable set satisfies certain local constraints;

determining, via the blockchain smart contract, based on the decentralized blockchain consensus process, that at least one blockchain peer of the plurality of blockchain peers refuses to consent to the global nettable set;

iteratively executing the loop, via the blockchain smart contract, based on the determination that the at least one blockchain peer refuses to consent;

generating additional global nettable sets utilizing different gridlock resolution messages from the plurality of blockchain peers until each blockchain peer of the plurality of blockchain peers agrees to an optimum global nettable set via the decentralized blockchain consensus process;

endorsing the global nettable set, via the blockchain ledger, based on the agreement of each blockchain peer of the plurality of blockchain peers to the optimum global nettable set; and triggering automatic executing of payments included in the optimum global nettable set to resolve the gridlocked payment network without requirement of a central authority.

14. The non-transitory computer readable medium of claim 13, wherein the method further comprises storing an identification of the plurality of subsets of local payments via a data block on the blockchain ledger.

15. The non-transitory computer readable medium of claim 14, wherein payment amounts included in the plurality of subsets of local payments are concealed by the plurality of Pedersen commitments, respectively.

* * * * *